V. R. KOONTZ.
CUTTER HEAD.
APPLICATION FILED MAY 16, 1913. RENEWED MAY 25, 1914.
1,123,315.
Patented Jan. 5, 1915.
2 SHEETS—SHEET 1.
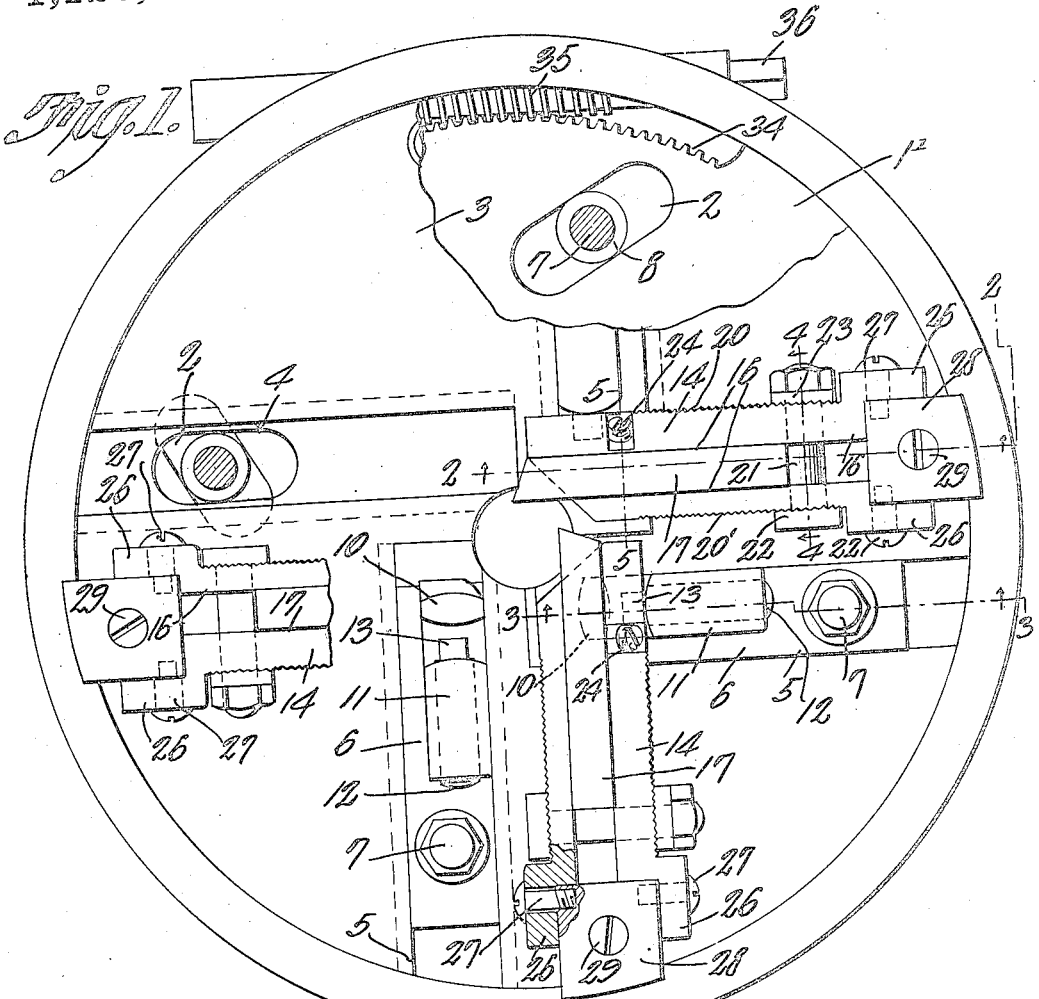
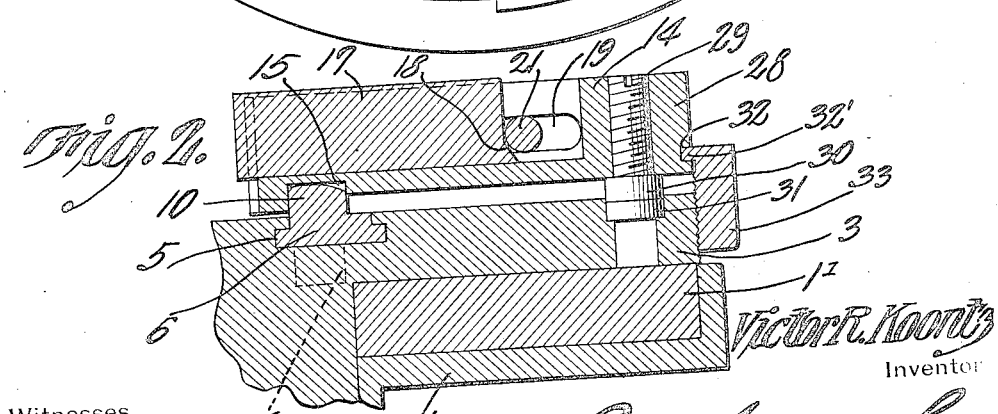
Witnesses
Victor R. Koontz
Inventor
by
Attorneys V. R. KOONTZ.
CUTTER HEAD.
APPLICATION FILED MAY 16, 1913. RENEWED MAY 25, 1914.
1,123,315.
Patented Jan. 5, 1915.
2 SHEETS—SHEET 2.
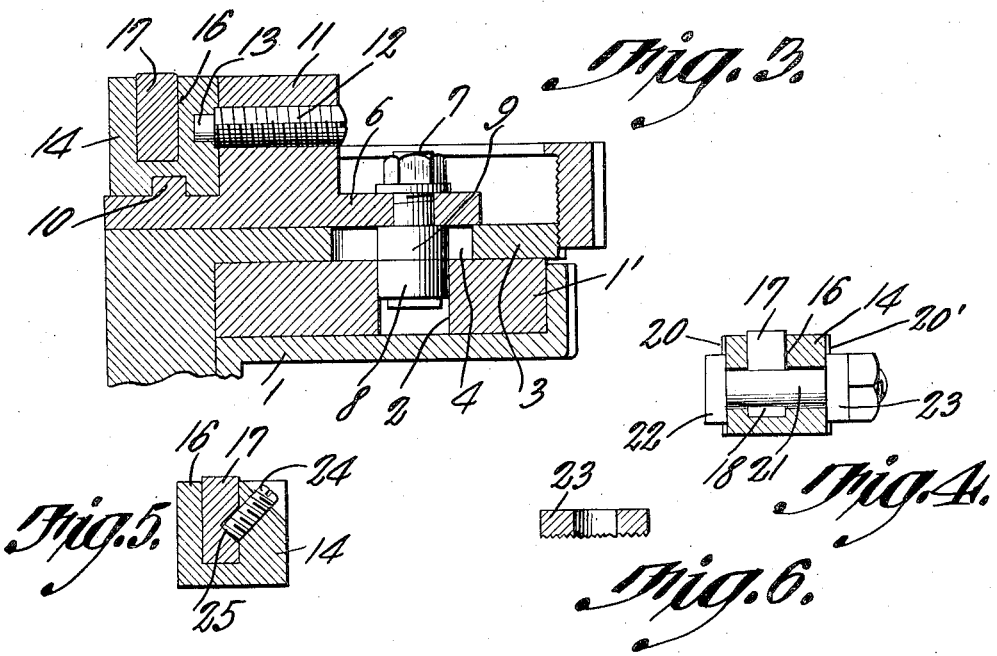
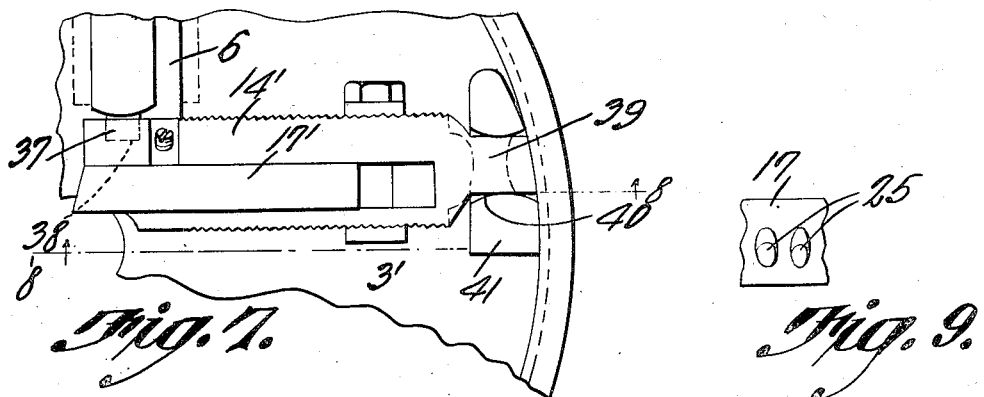
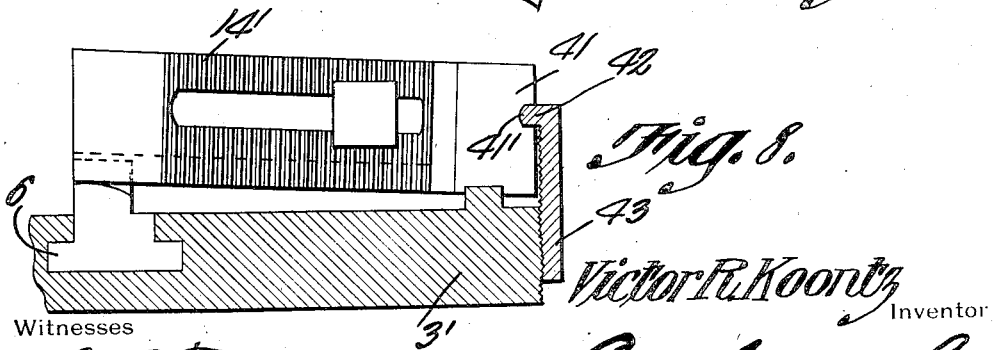
Witnesses
Victor R. Koontz, Inventor
Attorneys

UNITED STATES PATENT OFFICE.

VICTOR R. KOONTZ, OF WAYNESBORO, PENNSYLVANIA.

CUTTER-HEAD.

1,123,315.      Specification of Letters Patent.      Patented Jan. 5, 1915.

Application filed May 16, 1913, Serial No. 768,182. Renewed May 25, 1914. Serial No. 840,960.

*To all whom it may concern:*

Be it known that I, VICTOR R. KOONTZ, a citizen of the United States, residing at Waynesboro, in the county of Franklin and State of Pennsylvania, have invented a new and useful Cutter-Head, of which the following is a specification.

The present invention relates to improvements in cutter heads, and more particularly to that class of cutter heads, for the formation of threads upon bolts, one object of the invention being the provision of means for adjusting the tool or cutter holders so that a thread may be cut upon a machine or wood screw or bolt.

A further object of the present invention is the provision of a tool holder having means for spreading and retracting the members of the same to move the cutting end of the tool into and out of work engaging position.

A still further object of the invention is the provision of a two membered tool holder, one member of which is provided with means for imparting a straight line movement to the same in combination with the second member which bodily holds the tool and is hingedly connected to the first member and is adjustable to present the cutting end of the tool at any desired incline to the work, while the straight line moving member causes the members of the tool holder to be moved relatively to each other to move the cutting end of the tool into and out of work engaging position.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a view partly in elevation and partly in section of a complete cutter head, illustrating the detail structure and positioning of the tool holder and the mechanism for controlling the operation thereof. Fig. 2 is a section taken on line 2—2 of Fig. 1. Fig. 3 is a section taken on line 3—3 of Fig. 1. Fig. 4 is a section taken on line 4—4 of Fig. 1. Fig. 5 is a section taken on line 5—5 of Fig. 1. Fig. 6 is a detail sectional view through one of the locking washers of the tool holder. Fig. 7 is a fragmentary portion of a cutter head equipped with a modified form of tool holder. Fig. 8 is a section taken on line 8—8 of Fig. 7. Fig. 9 is a view showing a portion of the tool, and the method of holding the same against upward or outward movement.

Referring to the drawings, and more particularly to Figs. 1 through 6 and Fig. 9, the numeral 1 designates the carrying head or plate of the cutter head, which has mounted for oscillation therewithin, the tool projecting and retracting disk or member 1'. This member 1' is provided with a plurality of inclined slots 2, the purpose of which will presently appear. Mounted adjacent to the oscillatory disk or member 1', is the main tool carrying and guiding disk 3, which as shown in Fig. 1 is provided with a slot 4, one to each tool, and one to each slot 2 of the oscillatory member 1'. The outer face of the disk 3 is provided with the peculiar shaped guiding slot 5, one to each tool holder 6, a bolt 7 being connected to the tool holder 6 and extending through its respective slots 4 and 2, and carrying, as clearly illustrated in Fig. 3, the two anti-frictional rollers 8 and 9, the roller 8 being disposed in the slot 2 while the roller 9 is disposed in the slot 4. By this means, the oscillation of the plate or member 1', will impart a straight line movement to the bolt 7 and consequently the holder member 6.

The member 6 of the tool holder is provided at its inner end with the upstanding cam-shaped lug 10, and with the projection 11 intermediate of its ends, said projection 11 having disposed therein, the removable screw 12, provided with the reduced cylindrical end 13 for properly holding the removable member 14, which is in reality the receptacle for the tool 17, said tool being disposed in the longitudinal recess 16 of the member 14. By this means, it will be seen that the member 14 is so mounted that the outer end or the end adjacent the periphery of the member 3 is permitted a vertical tilting movement, with the cylindrical portion 13 of the screw 12 its pivoting point, the purpose of which will presently appear. The rear or non-cutting end of the tool 17, as clearly shown in Fig. 2, is provided with the lower projecting end 18, which when the bolt 21 is properly seated in the elongated slot 19 of the member 14 of the tool holder, will be engaged thereby and thus be held downwardly into the receptacle 16, while the head of the locking bolt 21 due to the serrated or toothed portions 20—20' of the member 14 and the toothed locking washers or heads 22 and 23 of the bolt 21, will properly grip the tool 17 to hold the same against undue movement during the operation of the cutter head. The shouldered portion 18 forms an additional safe guard against the upward movement of the inner or rear end of the tool, while in order to provide a means to prevent the tool from having its cutting end or the end adjacent the work lifted away from the member 3 and out of its holder 14, a lock screw 24 is carried by the member 14 and has its inner end seated within one of the sockets 25 of the tool 17, as clearly illustrated in Figs. 5 and 6.

In order to pivotally support the outer end of the member 14 of the tool holder, the apertured terminals 26 thereof which are disposed in spaced relation to fit astride of the block 28, carry the pivoting pins or screws 27 which are mounted in the block 28 to permit of the proper swinging movement of the member 14 relatively to the block 28 due to the elevating or lowering of such block 28 through the instrumentality of the recess 32, and the lip or rim 32' of the adjustable ring 33. This ring, as clearly shown in Fig. 2, is threaded upon the periphery of the tool carrying disk 3 and is readily adjustable to raise or lower the block 28. In order to provide a means to permit of the lateral swinging of the member 14 of the tool, the screw 29 is carried by the post 28 and has its cylindrical head 30 disposed for oscillatory and longitudinal movement in the cylindrical socket 31 of the tool operating member 3. By this means, the ring 33 and the pivoting member 39 and the disk 3 provide a means for properly securing and mounting the outer end of the tool holder member 14, yet permit it the necessary lateral swinging movement, due to the straight line movement imparted to the member 6 of the tool holder when the tool operating disk 1' is oscillated.

In order to oscillate the tool operating disk 1', any well known means may be employed, but in the present instance, a mutilated portion is provided at the periphery of the disk 1', as illustrated in Fig. 1, the same being toothed as at 34 for engagement with the operating screw 35, said screw 35 having an angular portion 36 carried by the relatively fixed portion 1 of the cutter head and in ready access to the operator.

From the foregoing description, taken in connection with the drawings, it is evident that with a cutter head constructed according to the present invention, that the inner cutting end of the tool 17 may be adjusted to be placed in parallel with the axis of the cutter head or at an incline thereto, thus providing means for cutting threads of different taper, as for instance upon lag screws, this adjustment being due entirely to the ring 33 and the bolt 28, while in order to permit of the proper lateral swinging movement of the members 6 and 14 to move the cutting end of the tool 17 into and out of work engaging position, the flexible connections at 10 and 15 of the members 6 and 14 of the tool holder are provided.

As shown in Figs. 7 and 8, a modified construction having the same function is provided. In this particular instance, the member 6 of the tool holder is provided with the pivoting point or projection 37, which seats within the socket 38 of the tool holder carrying member 14', which is constructed similarly to the member 14 heretofore described, for the proper reception of the tool 17'. The rear end of the member 14', however, is reduced as at 39, and is disposed in the cam-shaped slot 40 of the projection 41 carried by the tool holding disk 3', the same being provided with the socket 41' to receive the rim or projection 42 of the adjusting interiorly threaded ring 43. This ring 43 is similar to the ring 33, and is adjustable upon the tool carrying disk or member 3'. By this means it will be seen that the member 14' is properly pivoted at its outer end upon the projection 41 carried by the disk 3', and therefore is permitted the necessary flexing movement due to the straight line movement imparted to the member 6 of the tool carrier, the socket connection between the members 6' and 14', being such as to permit the necessary lateral swinging at this point due to the movement of the cutting end of the tool into and out of work engaging position.

It will be noted that by means of the pivotal connections at 27 and 28 of the tool holder carrying member 14, that such member 14 with the tool by disengaging the pivoting screw 12 from the member 14, may have its inner end swung outwardly from the tool holder carrying member 3 and thus facilitate the introduction and adjustment of the tool 17 in its carrying member 14, the same being readily locked in proper presentation position when moved toward the member 3 and locked in such position by means of the screw 12 and the cam projection 10.

What is claimed is:

1. A cutter head, including a main support, a tool holder carrying member connected thereto, a tool holder operating member disposed for movement relatively to the latter member, a tool holder composed of two members, one of which is carried by the tool holder carrying member for straight line movement and the other of which is mounted for lateral swinging movement, and coöperating means carried by the straight line movement member of the tool holder and the tool holder operating and carrying member whereby the members are swung laterally relatively to each other in directing the cutting end of the tool into and out of work engaging position.

2. A cutter head, including a main support, a tool holder carrying member connected thereto, a tool holder operating member disposed for movement relatively to the latter member, a tool holder composed of two members, one of which is carried by the tool holder carrying member for straight line movement and the other of which is mounted for lateral swinging movement, coöperating means carried by the straight line member of the tool holder and the tool holder operating and carrying member whereby all of the members are swung laterally relatively to each other in directing the cutting end of the tool into and out of work engaging position, and adjustable means coöperatively connected to the tool carrying member and the lateral swinging member of the tool holder for raising and lowering the outer end of the tool holder relatively to the inner or tool directing end thereof.

3. A cutter head, including a main carrying member, a stationary disk carried thereby, an oscillatory disk also carried thereby, a two-membered tool holder, one of which members is mounted for a straight line movement and is carried by the tool holder carrying member, coöperable means carried by said member of the tool holder and the oscillatory and tool carrying disks, whereby straight line movement is imparted to the member of the tool holder, and means for mounting the remaining member of the tool holder to the tool carrying disk, so that the tool cutting end of the member is disposed at various angles to the work.

4. A cutter head, including a main carrying member, a stationary disk carried thereby, an oscillatory disk also carried thereby, a two-membered tool holder, one of which members is mounted for a straight line movement and is carried by the tool holder carrying member, coöperable means carried by said member of the tool holder and the oscillatory and tool carrying disks, whereby straight line movement is imparted to the member of the tool holder, means for mounting the remaining member of the tool holder to the tool carrying disk so that the tool cutting end of the member is disposed at various angles to the work, said latter means including a ring adjustably connected to the tool carrying member, and coöperable means carried by the outer end of the tool holder and said ring for moving the outer end of the tool holder to and from the tool holder carrying member.

5. A cutter head, including a supporting member, a tool holder carrying member, an oscillatory tool actuating member, a tool holder composed of two parts hingedly connected together, one of said parts being mounted for straight line sliding movement upon the tool holder carrying member, coöperable means carried by said parts and the tool holder carrying and actuating member whereby when the actuating member is oscillated, a straight line sliding movement is imparted to one part of the tool holder, means for pivotally connecting the outer end of the remaining part of the tool holder to the tool holder carrying member, whereby when the actuating member is oscillated, the two parts of the tool holder are moved laterally relatively to each other and the cutting end of the tool is moved into and out of work engaging position.

6. A cutter head, including a supporting member, a tool holder carrying member, an oscillatory tool actuating member, a tool holder composed of two parts hingedly connected together, one of said parts being mounted for straight line sliding movement upon the tool holder carrying member, coöperable means carried by said parts and the tool holder carrying and actuating member whereby when the actuating member is oscillated the straight line sliding movement is imparted to the part of the tool holder, means for pivotally connecting the outer end of the remaining part of the tool holder to the tool holder carrying member, whereby when the actuating member is oscillated, the two parts of the tool holder are moved relatively to each other and the cutting end of the tool is moved into and out of work engaging position, and coöperative means carried by the tool holder carrying member and the outer end of the straight line moving part of the tool holder for moving such outer end to and from the tool holder carrying member.

7. A cutter head, including a supporting member, a tool holder carrying member, an oscillatory tool actuating member, a tool holder composed of two parts hingedly connected together, one of said parts being mounted for straight line sliding movement upon the tool holder carrying member, coöperable means carried by said parts and the tool holder carrying and actuating member, whereby when the actuating member is oscillated, the straight line sliding movement is imparted to the part of the tool holder, and means for pivotally connecting the outer end of the remaining part of the tool holder to the tool holder carrying member, whereby when the actuating member is oscillated, the two parts of the tool holder are moved laterally relatively to each other and the cutting end of the tool holder is moved into and out of work engaging position, said pivoted part being mounted to permit of the inner end thereof being swung to and from the straight line moving member of the tool holder.

8. A cutter head, including a supporting member, a tool holder carrying member, a tool holder actuating member, a tool holder composed of two parts hingedly connected together at their inner ends, one of said parts being mounted upon the carrying member for straight line movement, a pivotal support for the outer end of the other part adjustably connected to the tool holder carrying member adjacent the periphery thereof, and coöperable means carried by the tool holder actuating member and the straight line sliding part of the tool holder whereby the two parts are swung laterally to each other and the tool end of the holder is moved into and out of work engaging position.

9. A cutter head, including a supporting member, a tool holder carrying member, a tool holder actuating member, a tool holder composed of two parts hingedly connected together at their inner ends, one of said parts being mounted upon the carrying part for straight line movement, a pivotal support for the outer end of the other part adjustably connected to the tool holder carrying member adjacent the periphery thereof, coöperable means carried by the tool holder, actuating member and the straight line sliding part of the tool holder whereby the two parts are swung laterally relatively to each other and the work engaging end of the holder is moved into and out of work engaging position, and coöperable means carried by the pivoting portion of the swinging part of the tool holder and the tool holder carrying member for moving the outer end of such part to and from the tool holder carrying member.

10. A cutter head, including a support, a tool holder actuating member carried thereby, a tool holder operably connected to the member for swinging movement, a tool in the holder, and coöperable means carried by the support and holder for varying the angularity of the inner end of the holder and consequently the cutting edge of the tool relatively to the work.

11. A cutter head, including a support, a tool holder actuating member carried thereby, a tool holder, a tool in the holder, coöperable means carried by the support and holder for varying the angularity of the inner end of the holder and consequently the cutting edge of the tool relatively to the work, and coöperable means carried by the holder and actuating member for operably connecting the members and holder, whereby when the actuating member is moved relatively to the support, the holder is actuated to move the cutting end of the tool into and out of work engagement.

12. A cutter head, including a support, a tool holder actuating member, a tool holder operably connected adjacent its inner end to the actuating member, a tool in the holder, said tool having a cutting edge for cutting a plurality of threads upon a bolt, and coöperable means carried by the support and the outer end of the holder for presenting the cutting edge of the tool at varying angles, whereby a straight or tapered thread may be cut.

In testimony that I claim the foregoing as my own, I have hereto affixed my signature in the presence of two witnesses.

VICTOR R. KOONTZ.

Witnesses:
　JOHN B. STORM,
　JOSEPHINE ROLLMAN.